April 23, 1963   H. L. BOWDITCH   3,086,702
PNEUMATIC FORCE BALANCE COMPUTING APPARATUS
Filed March 14, 1960   4 Sheets-Sheet 1

INVENTOR.
Hoel L. Bowditch
BY
Curtis, Morris & Safford
ATTORNEYS

April 23, 1963         H. L. BOWDITCH         3,086,702
PNEUMATIC FORCE BALANCE COMPUTING APPARATUS
Filed March 14, 1960                          4 Sheets-Sheet 2

INVENTOR.
Hoel L. Bowditch
BY
Curtis, Morris & Safford
ATTORNEYS

April 23, 1963   H. L. BOWDITCH   3,086,702
PNEUMATIC FORCE BALANCE COMPUTING APPARATUS
Filed March 14, 1960   4 Sheets-Sheet 3

INVENTOR.
Hoel L. Bowditch
BY
*Curtis, Morris & Safford*
ATTORNEYS

April 23, 1963     H. L. BOWDITCH     3,086,702
PNEUMATIC FORCE BALANCE COMPUTING APPARATUS
Filed March 14, 1960     4 Sheets-Sheet 4
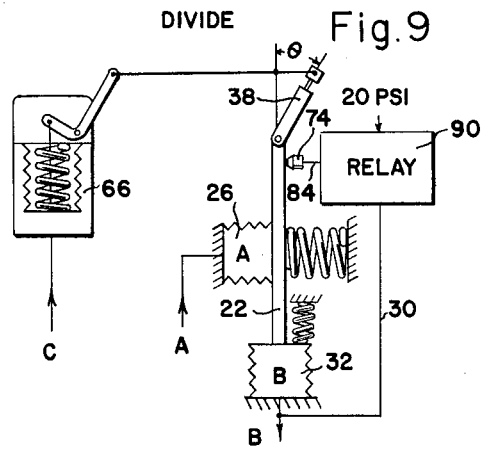
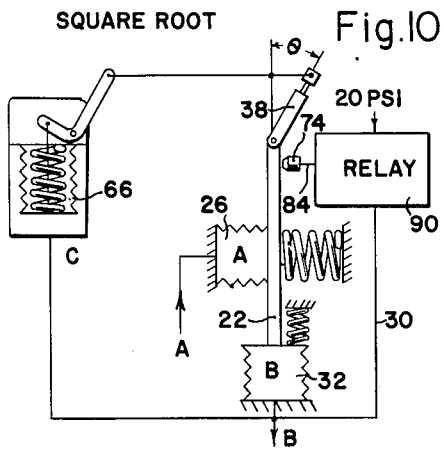
Fig.9 DIVIDE
Fig.10 SQUARE ROOT
Fig.11 SQUARING
Fig.12
Fig.13 SERIES
INVENTOR.
Hoel L. Bowditch
BY
Curtis, Morris & Safford
ATTORNEYS United States Patent Office 3,086,702
Patented Apr. 23, 1963

3,086,702
PNEUMATIC FORCE BALANCE COMPUTING
APPARATUS
Hoel L. Bowditch, Foxboro, Mass., assignor to The Foxboro Company, Foxboro, Mass., a corporation of Massachusetts
Filed Mar. 14, 1960, Ser. No. 14,841
15 Claims. (Cl. 235—61)

This invention relates to computers for performing mathematical operation such as multiplication, division and the like. Apparatus constructed in accordance with this invention is adapted to receive one or more input signals and to produce an output signal representing the results of the particular mathematical operation performed on the input signal or signals.

There has existed for some time a need for an acurate computer that can perform certain basic mathematical operations, and yet that is relatively inexpensive to construct and reliable in operation. For various reasons, moreover, it is desirable that such a computer be arranged to receive pneumatic input signals and to produce pneumatic output signals. Pneumatic computers have been proposed heretofore, but these prior arrangements have not been fully satisfactory. For example, in pneumatic computers wherein the mathematical operation is controlled by the positioning of a rolling wheel or the like, difficult problems are encountered due to frictional and related effects which cause the wheel to tend to stick and move unevenly as it is being shifted from one position to another and thereby impair the accuracy of the computation.

Accordingly, it is an object of this invention to provide improved computing apparatus. It is a further object of this invention to provide accurate computing apparatus that is relatively inexpensive to build. It is a more specific object of this invention to provide such computing apparatus having minimal friction effects. Yet another obejct of this invention is to provide superior computing apparatus of the type that is operable by pneumatic pressure signals. Other objects, aspects and advantages of the invention will in part be pointed out in, and in part apparent from, the following description of preferred embodiments of the invention, considered together with the accompanying drawings in which:

FIGURE 9 is a diagrammatic view of the computer arranged to perform a mathematical division of two input signals;

FIGURE 10 is a diagrammatic view of the computer arranged to extract the square root of an input signal;

FIGURE 11 is a diagrammatic view of the computer arranged to produce an output corresponding to the square of an input signal;

FIGURE 12 is a modified arrangement for performing both multiplication and division simultaneously; and FIGURE 13 is another modified arrangement for performing both multiplication and division simultaneously.

Figure 1:
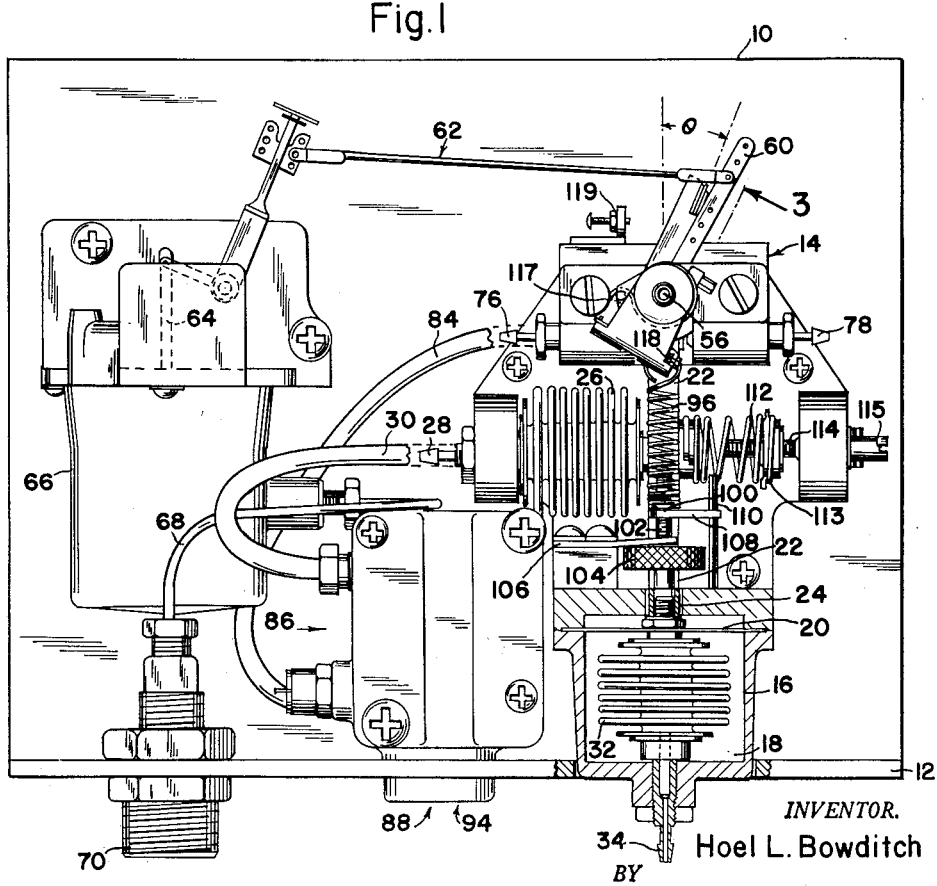
FIGURE 1 is a plan view of a computer constructed in accordance with this invention, and arranged to produce an output signal corresponding to the product (multiplication) of two input signals.

Referring now to the plan view of FIGURE 1, the computer shown there includes a chassis 10 having a front panel 12 through which various connections are made to operating elements of the apparatus. Fastened to the chassis is a support structure, generally indicated at 14, to which is bolted at one end a cup member 16 defining a cylindrical chamber 18. A spring plate 20, serving as a flexure, is secured at its peripheral edges between the cup member 16 and the support structure 14.

An elongated balanceable member consisting of a force bar 22 is fastened securely to flexure 20 at the center thereof, and extends through an opening 24 in the chamber 18 to the other end of the support structure 14. As will be explained, the flexure 20 accommodates longitudinal movement of the force bar 22 as well as lateral pivoting movement thereof.

Pressed against the left-hand side of the bar 22 is a first force-producing means comprising a lateral bellows 26. The interior of this bellows communicates with a nipple 28 and a flexible hose 30 adapted to supply pneumatic pressure to the bellows. Within the chamber 18 is a second force-producing means comprising an axial bellows 32 arranged to apply a longitudinal force to the bar 22. The interior of this bellows communicates with a nipple 34 to which is applied, in the form of a pneumatic pressure, one of the input signals for the computer.

Figure 3:
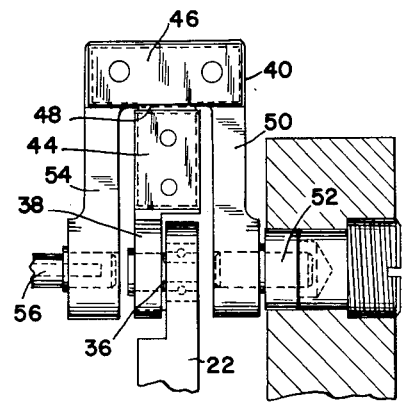
FIGURE 3 is a partial view taken along the sectional line 3 in FIGURE 1 to show details of the adjustable yoke mounting.

Referring now to FIGURE 3, the remote end of the force bar 22 is pivotally pinned at 36, by means of shielded ball bearings, to a third force-producing means specifically comprising a lever 38 serving as a motion restraining element for controlling the movements of bar 22 in response to changes in the forces applied by bellows 26 and 32. This lever 38 is pivotally secured (referring also to FIGURE 5) to a yoke 40 by means of a flexure strip 42 which is held in place by clamp plates 44 and 46. Flexure strip 42 provides an essentially frictionless pivot axis 48 for lever 38 so as to assure high accuracy in the computer operation.

One leg 50 of yoke 40 is rotatably mounted in a bearing 52 in the support structure 14, this bearing being aligned coaxially with bearing 36 when the force bar 22 is in its normal or center position. The other leg 54 of the yoke is connected to a shaft 56 which extends through a rigid plate 58 (FIGURE 2) fastened to the support structure 14.

Secured to the outer end of shaft 56 is an arm 60 (FIGURE 1) forming part of a linkage mechanism generally indicated at 62. The other end of this linkage mechanism is fastened to the movable output member 64 of a pressure-responsive means comprising a conventional receiver element 66 of the type having therein a bellows arranged to apply a longitudinal force to output member 64. This internal bellows, which is not shown in FIGURE 1, communicates through a pipe 68 to an input connection 70 on the chassis front panel 12. The receiver element 66 also includes the usual internal spring biasing means arranged to oppose the bellows force, so that the output member 64 takes a position linearly corresponding to the magnitude of the pneumatic input signal coupled to connection 70.

Figure 5:
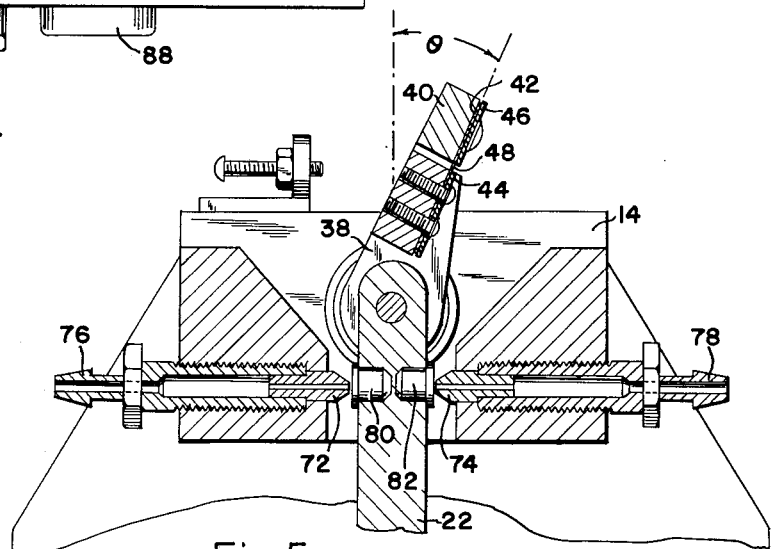
FIGURE 5 is a partial section taken along line 5—5 of FIGURE 2.

As shown in FIGURE 5, the support structure 14 is arranged to receive a pair of sensing devices consisting of pneumatic nozzles 72 and 74 to which air under pressure is to be supplied through corresponding nipples 76 and 78. A pair of anvils 80 and 82 are fitted into the force bar to cooperate with the nozzles for controlling the amount of air flowing therethrough, as will be described.

Figure 4:
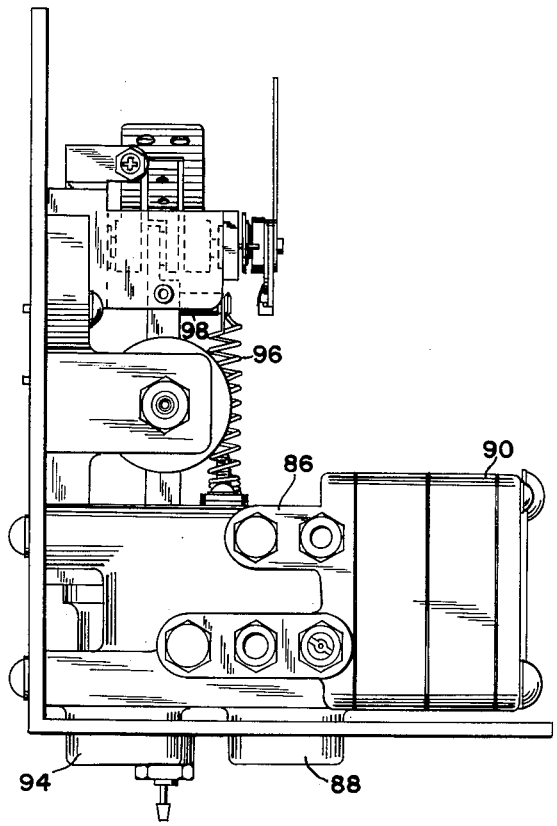
FIGURE 4 is a side view of the force-balance portions of the computer.

During a typical operation of the computer only one of the nozzles 72 or 74 will be functioning. When the computer is used to multiply two input signals, as shown in FIGURE 1, the right-hand nozzle 74 is disconnected, and the left-hand nozzle 72 is furnished with air through a hose 84. The remote end of this hose is connected through a manifold 86 to a pneumatic relay 90 (such as the type shown in U.S. Patent 2,631,570) which is supplied with air under pressure, e.g. 20 p.s.i., through a connection 88 in the front panel 12 (FIGURE 4). This relay includes a line restrictor (not shown herein, but of the type ordinarily used in flapper-nozzle control devices) interposed between the air supply line and the hose 84, so that the back pressure of the nozzle 72 will be controlled by the positioning of the anvil 80 relative to the mouth of the nozzle 72. The pneumatic relay is arranged to produce an output pressure directly corresponding to the nozzle back pressure. This relay output pressure is fed through hose 30 to the lateral bellows 26, and also is fed to an output connection 94 in the front panel 12.

It will be evident from the above description that the two bellows 26 and 32 apply forces to the force bar 22 in directions that are mutually perpendicular. This relationship is indicated in the vector diagram of FIGURE 6, which shows the applied forces as they appear at the bearing 36. In this diagram, the magnitude and direction of the force developed by the lateral bellows 26 is represented by vector A, and the magnitude and direction of the force developed by the axial bellows 32 is represented by vector B. These two forces thus produce on the force bar bearing 36 a total or combined force represented by the vector T. (Note: the magnitudes of vectors A and B correspond directly to the magnitudes of the pneumatic pressure signals applied to bellows 26 and 32, and for the sake of simplicity these signal values will be referred to hereinafter as A and B respectively.)

Figure 6:
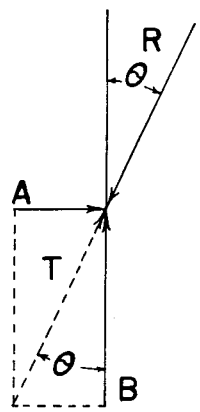
FIGURE 6 is a vector diagram demonstrating the relationship between the forces applied to the force bar.

When the forces on the bar 22 are in balance, the reaction force developed by the restraining element 38, represented by the vector R in FIGURE 6, directly opposes force T and is equal in magnitude thereto. Thus, in the balanced condition, the tangent of the angle $\theta$ will be equal to A divided by B, i.e. A/B. Referring also to FIGURES 1 and 5, it will be seen that the angle $\theta$ is the angle between the longitudinal axis of force bar 22 and the radial line of the element 38 (this radial line being defined as an imaginary straight line passing through bearing 36 and flexure pivot 48).

Reverting now to FIGURE 1, the separate parts of the linkage mechanism 62 are so proportioned relative to one another that the tangent of the angle $\theta$ is equal to the value (referred to hereinafter as "C") of the pneumatic pressure signal applied to receiver 66 through connection 70. In the particular embodiment described herein, receiver 66 operates over an input pressure range of 3 to 15 p.s.i. (the usual range for industrial pneumatic instruments), so that an input pressure of 3 p.s.i. corresponds to a signal value (C) of zero, and an input pressure of 15 p.s.i. corresponds to a signal value of one (or 100%). Thus, for example, if the pressure applied to connection 70 were 9 p.s.i., this would represent an input value (C) of 0.5, and the linkage 62 would set the restraining element 38 at such a position that the tangent of the angle $\theta$ would be equal to 0.5; hence, the angle $\theta$ would be 26.5°.

Accordingly, when the forces on force bar 22 are in balance, so that tan $\theta$ equals A/B, and with tan $\theta$ equal to C as explained above, then C equals A/B, and a simple transposition of this latter equation will show that $A = B \times C$. Consequently, under these conditions the pressure in the lateral bellows 26 represents, by its magnitude, the product of the pressure signals applied to axial bellows 32 and receiver 66. For example, if the signal pressures in bellows 32 and receiver 66 are both 9 p.s.i., i.e. representing input values (B and C) of 0.5 in a pressure range of 3 to 15 p.s.i., it will be found that the pressure in lateral bellows 26 must be 6 p.s.i. to provide a balanced condition of the force bar 22. This bellows pressure of 6 p.s.i. represents, in the pressure range of 3 to 15 p.s.i., a value of 0.25, which corresponds to the multiplication of the two input signals (i.e. $0.5 \times 0.5 = 0.25$).

Figure 7:
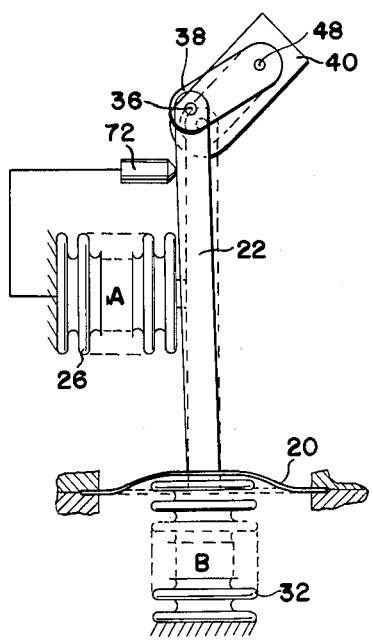
FIGURE 7 is a diagrammatic view of the force bar showing its movement when subjected to a change in axial force.

The forces on the force bar 22 are automatically maintained in balance by a feedback rebalancing arrangement including the nozzle 72, the pneumatic relay 90 and the lateral bellows 26. For example, referring now to FIGURE 7, if the forces on bar 22 were initially in balance, and subsequently the pressure in axial bellows 32 were increased, the force bar 22 and flexure 20 would be moved longitudinally from their original position shown in dotted outline to a new position as shown in solid outline (Note: the extent of movement is shown greatly exaggerated merely for illustrative purposes; in actual practice the amount of movement would be less than 0.001"). This longitudinal movement of the force bar is accompanied by a leftward lateral shift of the bar, due to the fact that the restraining element 38 must swing about its pivot axis 48, the yoke 40 remaining fixed in position.

Thus, the force bar 22 moves closer to the nozzle 72 which in turn reduces the outflow of air, and hence the back pressure in this nozzle increases because the pressure drop across the line restrictor (in relay 90) will decrease with the decrease in air flow. This increase in nozzle back pressure is fed to relay 90 which thereupon transmits a correspondingly increased rebalance signal through hose 30 to bellows 26. The force bar 22 thus will move to a new position where the forces on bar 22 again are in balance, and at this point the value (A) represented by the pressure in bellows 26 (A) will correspond to the product of the value (B) of the new pressure in bellows 32 multiplied by the value (C) of the pressure in receiver 66.

Figure 8:
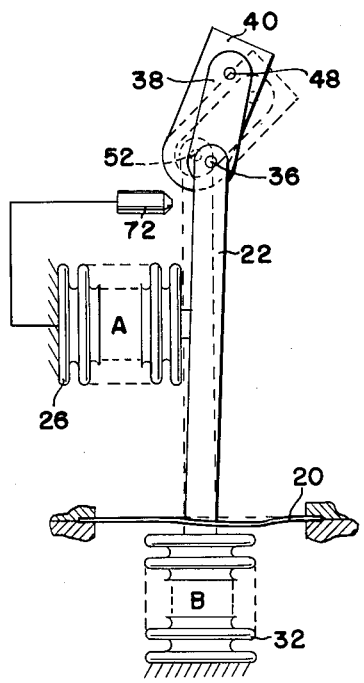
FIGURE 8 is a diagrammatic view of the force bar showing its movement in response to a change in angular position of the swingable restraining element.

On the other hand, if the pressure in receiver 66 is decreased, yoke 40 will be swung about its bearing 52, e.g. from its dotted outline position shown in FIGURE 8 to the position shown in solid outline. This will unbalance the forces on the bar 22, which thus moves to the right away from the nozzle 72 while the restraining element 38 pivots counterclockwise about its pivot 48. As a result of this movement, the nozzle 72 will be further uncovered so that the air outflow will increase, thereby decreasing the nozzle back pressure because of the increased pressure drop across the line restrictor. Accordingly, the pressure applied to the lateral bellows 26 by the pneumatic relay 90 decreases to the extent required to rebalance the forces applied to the bar 22, and thereby maintain the relationship $A$ equals $B \times C$.

It should particularly be noted that the force A at bearing 36, as shown in the vector diagram FIGURE 6, is not as large as the actual force produced by the lateral bellows 26. This is because the lateral bellows presses against the force bar at a point only about half way between the force bar pivot mounting 20 and the bearing 36, and therefore the moment arm for this bellows is only about half the length of the force bar. However, this creates no difficulty in the computer operation, for an exact correspondence between the bearing forces A and B and the pressures applied to bellows 26 and 32 can readily be obtained by properly proportioning the effective areas of the bellows relative to one another. More specifically, with both bellows operating over the same input pressure range (e.g. 3 to 15 p.s.i.), the area of the lateral bellows should be larger than the area of the axial bellows in proportion to the extent that the moment arm of the lateral bellows is less than the length of the force bar. Alternatively, if for example it is desired to use bellows that are not so related, e.g. bellows of equal area, then the computer may be calibrated merely by rearranging the linkage mechanism 62 to provide a relationship between the angle $\theta$ and the pressure (C) in receiver 66 such that $\tan \theta = kC$, where $k$ is a constant different from one. The specific constant to use in any given situation can readily be determined in terms of the relative areas of the bellows and the moment arm of the lateral bellows.

The computer also is provided with means for making a "zero adjustment" of the forces applied to the force bar 22. For this purpose, referring now to FIGURES 1 and 4, a longitudinal zero spring 96 is secured at one end to a stud 98 on the force bar 22, and is fastened at its other end to a travelling nut 100 on a threaded shaft 102. This shaft is manually rotatable by a knurled wheel 104 for adjusting the longitudinal spring pressure. The wheel 104 is lightly held in position by tension plate 106, and the travelling nut 100 is prevented from rotating by means of an arm 108 having a forked end arranged to fit about a guide rod 110.

Similar means are provided for making a zero adjustment of the lateral forces. For this purpose, there is a lateral zero spring 112 arranged to press against the right-hand side (FIGURE 1) of the force bar 22, the spring tension being adjustable by a travelling nut 113 riding on a threaded shaft 114 having a slot 115 for a screwdriver. Beneath this threaded shaft (but not shown herein) is the usual guide rod adapted to engage an arm secured to the travelling nut to prevent rotation of this nut.

Figure 2:
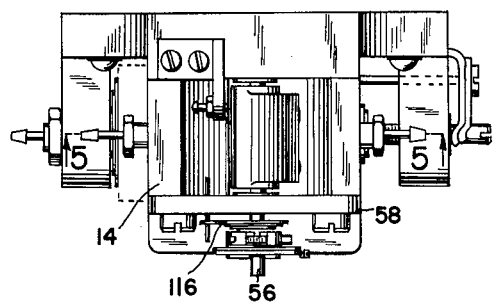
FIGURE 2 is a rear view of the force-balance portions of the computer.

Referring also to FIGURE 2, the yoke shaft 56 is connected to the inner end of a spiral spring 116, the outer end of which is anchored to the plate 58. This spring urges shaft 56 counterclockwise (referring to FIGURE 1), and serves to eliminate play in the linkage mechanism 62 and associated parts. Also, an adjustable sector gear connection 117 is interposed between shaft 56 and arm 60 for making a zero setting of the linkage mechanism. This gear connection is adjustable by a screw 118 riding with arm 60 and engageable with the sector gear to rotate the shaft 56 relative to arm 60. A stop device 119 also is secured to support structure 14 to limit the motion of the yoke 40.

As diagrammatically shown in FIGURE 9, the computer of the present invention can readily be arranged to divide two input values. For this purpose, the hose 84 leading from the relay 90 is connected to the right-hand nozzle 74 rather than to the left-hand nozzle 72 as in FIGURE 1. Also, the output from the relay is fed by hose 30 to the axial bellows 32 rather than to the lateral bellows 26.

As explained hereinabove, by maintaining the forces on bar 22 in balance, the signal value A (in bellows 26) will be equal to the product of the signal values B and C (in bellows 32 and receiver 66). Thus, by transposition, $B$ is equal to $A/C$, which is the operation performed by the FIGURE 9 arrangement. That is, the input pressure signals are applied to bellows 26 and receiver 66, and the resulting forces on bar 22 produce at nozzle 74 a rebalance signal which is fed through relay 90 to bellows 32 to maintain the forces in balance. A decrease in the pressure (A) applied to bellows 26 results in a corresponding reduction in the pressure (B) of bellows 32, while a decrease in the pressure (C) in receiver 66 results in a corresponding increase in the pressure (B) of bellows 32.

As shown in FIGURE 10, a similar arrangement can be used for extracting the square root of an input value. In this arrangement, the output of the relay 90 is connected to the receiver 66 as well as to the bellows 32. Since in this case C (the pressure in receiver 66) is made equal to B (the pressure in bellows 32), the equation $B = A/C$ can be revised to read $A = B^2$, or $B$ (the output value) $= \sqrt{A}$.

FIGURE 11 shows an arrangement for providing an output signal representing the mathematical square of an input signal. In this arrangement, as before, bellows 32 and receiver 66 (B and C) are connected together so that B is equal to C, and therefore $A = B^2$. With the input pressure signal (B) applied to bellows 32, and the lefthand nozzle 72 operative to feed a rebalance signal to bellows 26, the output signal (A) represented by the pressure in bellows 26 will correspond to the square of the input signal (B).

FIGURE 12 shows an arrangement for performing both multiplication and division at the same time. In this arrangement, the apparatus includes two computer sections 120 and 122, each similar to the single computer section shown in FIGURE 1, and each including its own balanceable force bar member 124 and 126. These computing sections also comprise respective groups of force-producing means including lateral bellows 128 and 130, axial bellows 132 and 134, and adjustable motion-restraining elements 136 and 138. The force bars 124 and 126 are mounted adjacent the corresponding axial bellows 132 and 134, in the manner described with reference to FIGURE 1, to accommodate longitudinal movement as well as pivotal movement of the force bars. The restraining elements 136 and 138 are, as in FIGURE 1, pivotally secured to the respective force bars, and also are pivotally mounted on swingable yoke means 140 arranged to control the angular positioning of these elements. Each computing section also is provided with a nozzle 142 and 144 operable with the corresponding force bars to produce rebalance signals in accordance with lateral movement of the force bars.

The first nozzle 142 is coupled through the usual line restrictor 146 to a pneumatic relay 148 which is furnished with air under pressure (e.g. 20 p.s.i.), and which transmits a rebalance signal to a receiver element 150. This receiver positions the yoke means 140 in such a location that the tangent of the angle between restraining element 136 and force bar 124 corresponds directly to the magnitude of the signal applied to receiver 150. It will be apparent that the position of the other restraining element 138 will be similarly determined, due to the common yoke means 140. The other nozzle 144 is coupled through a line restrictor 152 to a second pneumatic relay 154 the output of which is transmitted to lateral bellows 130, and also to a line 156 serving as the output signal connection.

To simplify the explanation of this FIGURE 12 arrangement, the signal applied to lateral bellows 128 will be referred to as A, the signal to axial bellows 132 as B, the signal to receiver 150 as C, the signal to lateral bellows 130 as N, and the signal to axial bellows 134 as M.

As discussed hereinabove with reference to FIGURE 1, when the forces on force bar 124 are in balance, the output signal C of the first computer section 120 will be equal to the input signal A (lateral bellows 128) divided by the input signal B (axial bellows 132), i.e. $C = A/B$. This signal C controls the positioning of both restraining elements 136 and 138 and this positioning serves as one input to the second computer section 122, while the other input signal M is applied to axial bellows 134. The forces in the second section 122 are maintained in balance by the action of nozzle 144 which feeds a rebalance signal through relay 154 to lateral bellows 130. When the second section force bar 126 is in balance, $C = N/M$ for the reasons previously discussed. Accordingly, by manipulation of these equations, it will be evident that N (the final output signal) in line 156 will be equal to $M \times (A/B)$.

Although in the above discussion of FIGURE 12 it was assumed that the linkage between receiver 150 and yoke means 140 was calibrated in such a way that the tangent of the angle formed by restraining element 136 and force bar 124 was equal to the value of the signal (C) applied to receiver 150, this is not an essential requirement in the FIGURE 12 arrangement. This is because the pressure in receiver 150 is not used as an output signal, and hence the value represented by this pressure need not necessarily relate specifically to the signal values A and B. Regardless of the linkage mechanism used, the rebalance signal produced by nozzle 142 always will be such as to position restraining element 136 at the correct angle to maintain the forces in the first computer section 120 in balance, and it is this angle which serves as the input signal for the second computer section 122.

FIGURE 13 shows another arrangement for performing both multiplication and division at the same time. Like the FIGURE 12 embodiment, this arrangement includes two computer sections 160 and 162 each having a force bar 164 and 166, and each force bar being controlled by lateral bellows 168 and 170, axial bellows 172 and 174, and restraining elements 176 and 178. These latter elements are individually operated by corresponding receivers 180 and 182, arranged to position the elements in such a manner that the tangent of the angle between each element and the corresponding force bar is equal to the value of the signal applied to the respective receiver. Nozzle 184 for force bar 164 operates a relay 186 to apply rebalance pressure to axial bellows 172, while nozzle 188 for force bar 166 operates a second relay 190 to apply rebalance pressure to lateral bellows 170 and to an output signal connection 192. The intermediate output (B) of the first section 160 is coupled to the axial bellows 174 of the second computer section 162, as an input signal for this second section.

As before, when the first computer section 160 is in balance, the relationship between the forces is such that $B = A/C$. Also, when the second computer section 162 is in balance, the relationship of the forces is such that $N = M \times B$. Thus it will be seen that N (the final output signal) is equal to $M \times (A/C)$.

Although several preferred embodiments of the invention have been set forth in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:
1. Computing apparatus adapted to receive an input including one or more variable signals and to produce an output representing a mathematical operation on said input; said apparatus comprising: a support structure, a balanceable member mounted for movement with respect to said support structure, first signal-responsive means for producing a first force acting on said balanceable member in one direction; second signal-responsive means for producing a second force acting on said balanceable member in a direction transverse to said one direction; movement controlling means connected to said balanceable member to determine the direction of movement of said member in response to changes in either of said first or second forces, said movement controlling means comprising a pivotally mounted element located adjacent said balanceable member, a flexure secured to said element with one end extending towards said balanceable member, and connection means for securing said flexure end to said balanceable member, signal-responsive adjustment means coupled to said controlling means to vary the positioning of said element about its pivot mounting and alter the angular relationship between said flexure and said balanceable member; sensing means arranged to detect changes in position of said balanceable member and to produce a rebalance signal in response to such changes; and signal transmission means for feeding said rebalance signal to one of said signal-responsive means to maintain the forces on said member in balance.

2. Computing apparatus adapted to receive an input including one or more variable signals and to produce an output representing a mathematical operation on said input; said apparatus comprising: a support structure, a balanceable member mounted for movement with respect to said support structure, first signal-responsive means for producing a first force acting on said balanceable member in one direction; second signal-responsive means for producing a second force acting on said balanceable member in a direction transverse to said one direction; a reaction linkage having a cross-arm and a pair of side legs, said reaction linkage being pivotally mounted to said support structure with said side legs being disposed symmetrically with respect to the axis of said balanceable member, pivotal connection means for fastening one end of the said balanceable member to said cross-arm of said linkage, sensing means responsive to changes in positioning of said balanceable member and adapted to produce a corresponding rebalance signal; and signal transmission means for feeding said rebalance signal to one of said signal-responsive means to maintain the forces on said member in balance.

3. Apparatus adapted for performing mathematical operations and comprising, in combination, a balanceable force bar, mounting means including flexible spring strip flexure means connected to said force bar adjacent one end thereof and arranged to accommodate longitudinal movement of said force bar as well as lateral pivoting movement thereof, first pressure-responsive means for applying to one side of said force bar a first force in a lateral direction, second pressure-responsive means arranged to apply to said force bar a second force in a longitudinal direction, an adjustable reaction element coupled to the other end of said force bar to develop a restraining force opposing said first and second forces, pneumatic nozzle means fixed in position alongside said force bar to detect any unbalance in the forces applied thereto, relay means coupled to said nozzle means, and rebalance means operable by the output pressure of said relay means for controlling at least one of said forces to maintain a balance of the forces applied to said force bar.

4. Apparatus adapted for performing mathematical operations and comprising, in combination, a balanceable force bar, mounting means connected to said force bar adjacent one end thereof and arranged to accommodate longitudinal movement of said force bar as well as lateral pivoting movement thereof, said mounting means including at least one flexure connection, first pressure-responsive means for applying to one side of said force bar a first force in a lateral direction, second pressure-responsive means arranged to apply to said one end of said force bar a second force in a longitudinal direction, an adjustable reaction element for developing a restraining force opposing said first and second forces, means for connecting said element to said force bar to provide for swinging movement of said element about said force bar, said connecting means including at least one flexure connector, pneumatic nozzle means fixed in position alongside said force bar to detect any unbalance in the forces applied thereto, relay means coupled to said nozzle means, and rebalance means operable by the output pressure of said relay means for controlling at least one of said forces to maintain a balance of the forces applied to said force bar.

5. Computing apparatus adapted to receive an input including one or more variable signals and to produce an output representing a mathematical operation on said input; said apparatus comprising: support means; a balanceable member; flexure means for mounting said balanceable member on said support means and for providing essentially frictionless motion of said balanceable member with respect to said support means; first force-producing means adapted to be activated by a signal and arranged to apply to said balanceable member a corresponding first force in one direction, second force-producing means adapted to be activated by a signal and arranged to apply to said balanceable member a corresponding second force having at least a component thereof in a direction perpendicular to said one direction; third force-producing means adapted to be activated by a signal and including a restraining element coupled to said balanceable member to develop in response to said first and second forces a reaction force opposing said first and second forces, said restraining element being shiftable about said balanceable member to vary the direction of said reaction force; motion transmitting means forming part of said third force-producing means and actuable in response to the signal fed thereto to orient said restraining element in a position corresponding to said signal, said motion transmitting means including flexure means for providing essentially frictionless pivotal movement of said restraining element with respect to said motion transmitting means; sensing means positioned to detect any change in the forces applied to said balanceable member and to produce a corresponding rebalance signal, signal transmission means for feeding said rebalance signal to one of said force producing means and for feeding said input to the other two force-producing means, and output means responsive to the signal applied to said one force-producing means for developing an output signal representing the results of the mathematical operation on said input.

6. Computing apparatus adapted to receive an input including one or more variable signals and to produce an output representing a mathematical operation on said input; said apparatus comprising: a balanceable member; first force-producing means adapted to be activated by a signal and arranged to apply to said balanceable member a corresponding first force in one direction, said first force having a magnitude directly proportional to the magnitude of the signal supplied to said first force-producing means; second force-producing means adapted to be activated by a signal and arranged to apply to said balanceable member a corresponding second force having at least a component thereof in a direction perpendicular to said one direction, said second force having a magnitude directly proportional to the magnitude of the signal supplied to said second force-producing means; third force-producing means adapted to be activated by a signal and including a restraining element engaged with said balanceable member to develop a reaction force in response to said first and second forces, said restraining element being shiftable about said balanceable member to vary the direction of said reaction force; motion-transmitting means forming part of said third force-producing means and actuable in response to the signal fed thereto to orient said restraining element in a position where the tangent of the angle between said one direction and the direction of said reaction force corresponds directly to the magnitude of the signal supplied to said third force-producing means; sensing means including means to detect any change in the position of said balanceable member and to produce a corresponding rebalance signal, signal transmission means for feeding said rebalance signal to one of said force-producing means and for feeding said input to the other two force-producing means, and output means coupled to said one force-producing means for developing an output signal corresponding to said rebalance signal and representing the results of the mathematical operation on said input.

7. Apparatus as claimed in claim 6, wherein said input comprises two signals representing values which are to be multiplied, said sensing means being arranged to detect any movement of said balanceable member in said one direction, said two signals being fed respectively to said second and third force-producing means, and said rebalance signal being fed to said first force-producing means.

8. Apparatus as claimed in claim 6, wherein said input comprises two signals representing values which are to be divided, said sensing means being arranged to detect any movement of said balanceable member in said one direction, said two signals being fed respectively to said first and third force-producing means, and said rebalance signal being fed to said second force-producing means.

9. Apparatus as claimed in claim 6, wherein said input comprises one signal representing a value the square root of which is to be extracted, said sensing means being arranged to detect any movement of said balanceable member in said one direction, said input signal being fed to said first force-producing means, and said rebalance signal being fed to said second and third force-producing means.

10. Computing apparatus adapted to receive an input including one or more variable signals and to produce an output representing a mathematical operation on said input; said apparatus comprising a balanceable member; first pressure-responsive means adapted to be activated by a pneumatic signal and arranged to apply to said balanceable member a corresponding first force in one direction, said first force having a magnitude directly proportional to the pneumatic signal supplied to said first pressure-responsive means; second pressure-responsive means adapted to be activated by a pneumatic signal and arranged to apply to said balanceable member a corresponding second force having at least a component thereof in a direction perpendicular to said one direction, said second force having a magnitude directly proportional to the pneumatic signal supplied to said second pressure-responsive means; a restraining element pivotally secured to said balanceable member to develop a reaction force in response to said first and second forces, said restraining element being shiftable about said balanceable member to vary the direction of said reaction force; third pressure-responsive means adapted to be activated by a pneumatic signal, motion-transmitting means operable by said third pressure-responsive means to orient said restraining element in a position where the tangent of the angle between said one direction and the direction of said reaction force corresponds directly to the pneumatic signal supplied to said third pressure-responsive means; sensing means arranged to detect any change in the forces applied to said balanceable member and to produce a corresponding pneumatic rebalance signal, signal transmission means for feeding said pneumatic rebalance signal to one of said pressure-responsive means and for feeding said input to the other two pressure-responsive means, and output means coupled to said one pressure-responsive means for developing a pneumatic output signal representing the results of the mathematical operation on said input.

11. Apparatus of the type described comprising a support structure, a balanceable member mounted for movement with respect to said support structure, first signal-responsive means for producing a first force acting on said balanceable member in one direction; second signal-responsive means for producing a second force acting on said balanceable member in a direction transverse to said one direction; movement controlling means connected to said balanceable member to determine the direction of movement of said member in response to changes in either of said first or second forces, said movement controlling means including a pivotally mounted element located adjacent said balanceable member, a flexure secured to said element with one end extending towards said balanceable member, and connection means for securing said flexure end to said balanceable member, the connection of said flexure to said member being aligned with the pivot axis of said element when said member is in its normal position; adjustment means coupled to said controlling means to vary the positioning of said element about its pivot mounting; sensing means arranged to detect changes in position of said balanceable member and to produce a rebalance signal in response to such changes; and signal transmission means for feeding said rebalance signal to one of said signal-responsive means to maintain the forces on said member in balance.

12. Apparatus of the type described comprising a support structure, a balanceable member mounted for movement with respect to said support structure, first signal-responsive means for producing a first force acting on said balanceable member in one direction; second signal-responsive means for producing a second force acting on said balanceable member in a direction transverse to said one direction; a U-shaped yoke element pivotally mounted at the ends of its side legs to said support structure in a location adjacent said balanceable member, the pivot axis of said yoke passing through said balanceable member, a flexure strip secured to the cross-arm of said yoke with one end extending towards said yoke pivot axis, pivotal connection means fastening said one end of said flexure to said balanceable member at a location aligned with said yoke pivot axis, and adjustment means coupled to said yoke to vary the positioning thereof about its pivot axis; sensing means responsive to changes in positioning of said balanceable member and adapted to produce a corresponding rebalance signal; and signal transmission means for feeding said rebalance signal to one of said signal-responsive means to maintain the forces on said member in balance.

13. Apparatus for performing a mathematical computation on three variable input signals, comprising two computing sections each including a balanceable member; two groups of first, second and third force-producing means, each group being associated with one of said computing sections and operable to apply forces to the respective balanceable member corresponding to signals supplied to the individual force-producing means, the first and second forces developed by the first and second force-producing means of each group being in directions transverse to one another; each of said third force-producing means including an adjustable reaction element arranged to develop a reaction force in opposition to the forces produced by the corresponding first and second force-producing means of that group, the direction of the reaction force in each instance being determined by the positioning of the respective reaction element relative to its corresponding balanceable member; connection means coupling one force-producing means of one group to one force-producing means of the other group to provide correspondence of action therebetween; sensing means for each computing section to produce a rebalance signal in response to any unbalance in the forces applied to the balanceable member of that section; and signal-transmission means for feeding each rebalance signal to one of the force-producing means of the corresponding computing section to maintain the forces on the associated balanceable member in balance.

14. Apparatus for multiplying two values and for dividing the product of those two values by a third value, comprising two computing sections each including a balanceable member; two groups of first, second and third force-producing means, each group being associated with one of said computing sections and operable to apply forces to the respective balanceable member corresponding to signals supplied to the individual force-producing means, the first and second forces developed by the first and second force-producing means of each group being in directions transverse to one another; each of said third force-producing means including an adjustable reaction element arranged to develop a reaction force in opposition to the forces produced by the corresponding first and second force-producing means of that group, the direction of the reaction force in each instance being determined by the positioning of the respective reaction element relative to its corresponding balanceable member; sensing means for each computing section to produce a rebalance signal in response to any unbalance in the forces applied to the balanceable member of that section; and signal-transmission means for feeding each rebalance signal to one of the force-producing means of the corresponding computing section, said signal-transmission means further including means to feed the rebalance signal from one of said computing sections to another of the force-producing means of the other computing section.

15. Apparatus for multiplying two values and for dividing the product of those values by a third value, comprising two computing sections each including a balanceable member; two groups of first, second and third force-producing means, each group being associated with one of said computing sections and operable to apply forces to the respective balanceable member corresponding to signals supplied to the individual force-producing means, the first and second forces developed by the first and second force-producing means of each group being transverse to one another; each of said third force-producing means including an adjustable reaction element arranged to develop a reaction force in opposition to the forces produced by the corresponding first and second force-producing means of that group, the direction of the reaction force in each instance being determined by the positioning of the respective reaction element relative to its corresponding balanceable member; sensing means for each computing section to produce a rebalance signal in response to any unbalance in the forces applied to the balanceable member of that section; signal-transmission means for feeding each rebalance signal to one of the force-producing means of the corresponding computing section; and linkage means connecting together the reaction elements of both computing sections to provide correspondence in the positioning thereof.

References Cited in the file of this patent

UNITED STATES PATENTS

| | | |
|---|---|---|
| 2,736,199 | Ibbott | Feb. 28, 1956 |
| 2,910,084 | Frantz | Oct. 27, 1959 |
| 2,930,524 | Williams | Mar. 29, 1960 |
| 2,957,622 | Hulley | Oct. 25, 1960 |
| 2,967,537 | Morris | Jan. 10, 1961 |
| 2,970,476 | Cary | Feb. 7, 1961 |